(12) United States Patent
Hunt et al.

(10) Patent No.: US 12,163,879 B2
(45) Date of Patent: Dec. 10, 2024

(54) QUANTUM ENTANGLEMENT-BASED DETECTION SYSTEM (QE-bDS)

(71) Applicant: THE BOEING COMPANY, Chicago, IL (US)

(72) Inventors: Jeffrey H. Hunt, Thousand Oaks, CA (US); Pamela L. Blake, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 231 days.

(21) Appl. No.: 17/546,545

(22) Filed: Dec. 9, 2021

(65) Prior Publication Data

US 2022/0187200 A1   Jun. 16, 2022

Related U.S. Application Data

(60) Provisional application No. 63/123,600, filed on Dec. 10, 2020.

(51) Int. Cl.
*G01N 21/31* (2006.01)

(52) U.S. Cl.
CPC .............................. *G01N 21/3103* (2013.01)

(58) Field of Classification Search
CPC .... G01N 21/3103; G01N 21/17; G01N 21/21; G01N 2021/1748; G01N 2021/1793; G06N 10/40
See application file for complete search history.

(56) References Cited

U.S. PATENT DOCUMENTS

| | | |
|---|---|---|
| 9,264,225 B1 | 2/2016 | Hunt et al. |
| 9,350,461 B1 | 5/2016 | Smith et al. |
| 9,374,376 B2 | 6/2016 | Hunt et al. |
| 9,413,740 B2 | 8/2016 | Rouatbi et al. |
| 10,171,238 B2 | 1/2019 | Howe et al. |
| 10,756,891 B2 | 8/2020 | Howe et al. |
| 2009/0194702 A1* | 8/2009 | Meyers ................ H04L 9/0858 356/433 |
| 2010/0252745 A1* | 10/2010 | Hunt ..................... G01S 7/4861 250/372 |
| 2010/0278373 A1* | 11/2010 | Capron .................. G01S 17/89 356/51 |
| 2016/0209274 A1* | 7/2016 | Capron .................... G01J 9/04 |
| 2018/0149476 A1* | 5/2018 | Huang ................... H04B 10/70 |
| 2021/0156684 A1* | 5/2021 | Huang ................... G01S 17/06 |

* cited by examiner

*Primary Examiner* — Sang H Nguyen

(74) *Attorney, Agent, or Firm* — Alston & Bird LLP

(57) ABSTRACT

Methods of detecting material in an object are provided. The method includes emitting an entangled photon pair having a sensing photon and a local photon, directing the sensing photon to the object including a predetermined material, directing the local photon to a detector, and detecting a change in the local photon when the sensing photon encounters the predetermined material in the object.

16 Claims, 12 Drawing Sheets

QUANTUM ENTANGLEMENT-BASED DETECTION SYSTEM (QE-bDS)

CROSS REFERENCE TO RELATED APPLICATIONS

This application claims the benefit of and priority to U.S. Provisional Application Ser. No. 63/123,600, filed Dec. 10, 2020, which is hereby incorporated by reference in its entirety.

FIELD

The presently-disclosed invention relates generally to methods and systems for detecting material in an object, and more particularly to methods and systems for detecting material in an object employing quantum entangled photon pairs.

BACKGROUND

Whether in a small enclosed space, a larger volume, or in people, the remote detection of a gas, liquid, or solid (GLS) of interest is challenging, particularly when dealing with, for example, a dangerous GLS, remote characterization of environmental conditions, or remote characterization of Earth's surface, including air- and space-borne detection systems.

Quantum entanglement has been proposed as a basis for detection systems to characterize or detect a GLS of interest. In classical quantum entanglement-based detection systems, entangled photons are used to detect a target by sending one photon beam to the target, while a second photon beam remains behind. If the first photon beam reaches the target, the beam is absorbed and re-emitted. When this first beam returns to the second beam, measurements may be taken.

While useful, classical quantum entanglement-based detection systems also have pitfalls. For example, it can be difficult to get the first photon beam back to the second photon beam, which makes measurement challenging. It may be difficult to get the first photon beam to reunite with the second photon beam because when the first photon beam is absorbed and re-emitted, there is not much of the first photon beam left to return. Moreover, classical quantum entanglement-based detection systems are expensive and require substantial power resources.

Accordingly, there still exists a need for quantum entanglement-based detection systems and methods that provide reliable measurements while being power and cost-effective.

BRIEF SUMMARY

One or more embodiments of the invention may address one or more of the aforementioned problems. Certain embodiments according to the invention provide methods and systems for detecting material in an object employing quantum entangled photon pairs. In particular, according to a first aspect of the invention, a method of detecting material in an object is provided. The method includes emitting an entangled photon pair having a sensing photon and a local photon, directing the sensing photon to the object including a predetermined material, directing the local photon to a detector, and detecting a change in the local photon when the sensing photon encounters the predetermined material in the object.

According to certain embodiments, detecting the change in the local photon may indicate at least one of disentanglement and a change in photon energy distribution. In some embodiments, the change in the local photon may indicate the sensing photon was absorbed by the predetermined material.

According to certain embodiments, the method may further comprise delaying the local photon to synchronize movement of the local photon to the detector with interaction of the sensing photon with the object.

According to certain embodiments, emitting the entangled photon pair may comprise a repeating pulsed emission, a single pulse emission, or a steady stream emission.

According to certain embodiments, the predetermined material may be a gas, a solid, a liquid, or a plasma.

According to certain embodiments, the method may further comprise emitting a sequence of entangled photon pairs, and detecting a change between prior and subsequent local photons, wherein the change may indicate either the presence or absence of the predetermined material in the object.

In accordance with a second aspect of the invention, another method of detecting material in an object is provided. The method includes emitting a target band entangled photon pair at a target wavelength in an absorption band for a predetermined material, the target band entangled photon pair comprising a target band sensing photon and a target band local photon; emitting a guard band entangled photon pair at a guard wavelength outside of the absorption band for the predetermined material, the guard band entangled photon pair comprising a guard band sensing photon and a guard band local photon; directing the target band sensing photon and the guard band sensing photon to the object including the predetermined material; directing the target band local photon to a target band detector and the guard band local photon to a guard band detector; and detecting a change in at least one of the target band local photon and the guard band local photon when the target band sensing photon and the guard band sensing photon, respectively, encounter the predetermined material in the object.

According to certain embodiments, detecting the changes in the target band local photon and the guard band local photon may comprise measuring energy at the target wavelength and the guard wavelength, and comparing the energy in the target wavelength and the guard wavelength to determine if absorption occurred.

According to certain embodiments, the target wavelength for the absorption band of the predetermined material may be unknown, and the method may further comprise employing a target wavelength identification element to identify the target wavelength for the absorption band of the predetermined material prior to emitting the target band entangled photon pair and the guard band entangled photon pair.

According to certain embodiments, the target band entangled photon pair and the guard band entangled photon pair may be emitted simultaneously.

In accordance with a third aspect of the invention, a detection system is provided. The detection system includes a target band entangled photon pair emitter configured to emit a target band sensing photon and a target band local photon, the target band sensing photon being directed to an object; and a target band detector configured to receive the target band local photon and output a signal when the target band local photon indicates that the target band sensing photon has encountered a predetermined material in the object.

According to certain embodiments, the detection system may further comprise a guard band entangled photon pair emitter configured to emit a guard band sensing photon and a guard band local photon at a guard wavelength, the guard band sensing photon being directed to the object; and a guard band detector configured to receive the guard band local photon and output a signal if the guard band local photon indicates any changes in the guard band sensing photon. The guard wavelength may be outside the absorption band for the predetermined material.

According to certain embodiments, the target band entangled photon pair emitter may be configured to emit the target band sensing photon and the target band local photon at a target wavelength in an absorption band for the predetermined material. In some embodiments, when the target wavelength is unknown, the detection system may further comprise a target wavelength identification element configured to identify the target wavelength for the absorption band of the predetermined material.

According to certain embodiments, the detection system may further comprise a target band delay element configured to delay the target band local photon to synchronize movement of the target band local photon to the target band detector with interaction of the target band sensing photon with the object, and a guard band delay element configured to delay the guard band local photon to synchronize movement of the guard band local photon to the guard band detector with interaction of the guard band sensing photon with the object. In some embodiments, the target band delay element and the guard band delay element each may comprise an annulus delay element or a fiber optic cable.

According to certain embodiments, the target band entangled photon pair emitter and the guard band entangled photon pair emitter may be disposed on a moving platform. In some embodiments, the moving platform may comprise an aircraft, a spacecraft, a watercraft, or a land vehicle.

According to certain embodiments, the target band entangled photon pair emitter and the guard band entangled photon pair emitter may be configured to emit the target band entangled photon pair and the guard band entangled photon pair simultaneously.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

The invention includes, according to certain embodiments, methods and systems for detecting material in an object employing quantum entangled photon pairs that provide reliable measurements while being power and cost-effective. In particular, according to a first aspect of the invention, a method of detecting material in an object is provided. The method includes emitting an entangled photon pair having a sensing photon and a local photon, directing the sensing photon to the object including a predetermined material, directing the local photon to a detector, and detecting a change in the local photon when the sensing photon encounters the predetermined material in the object.

In accordance with certain embodiments, for example, the predetermined material may be a gas, a solid, a liquid, or a plasma.

Figure 2:
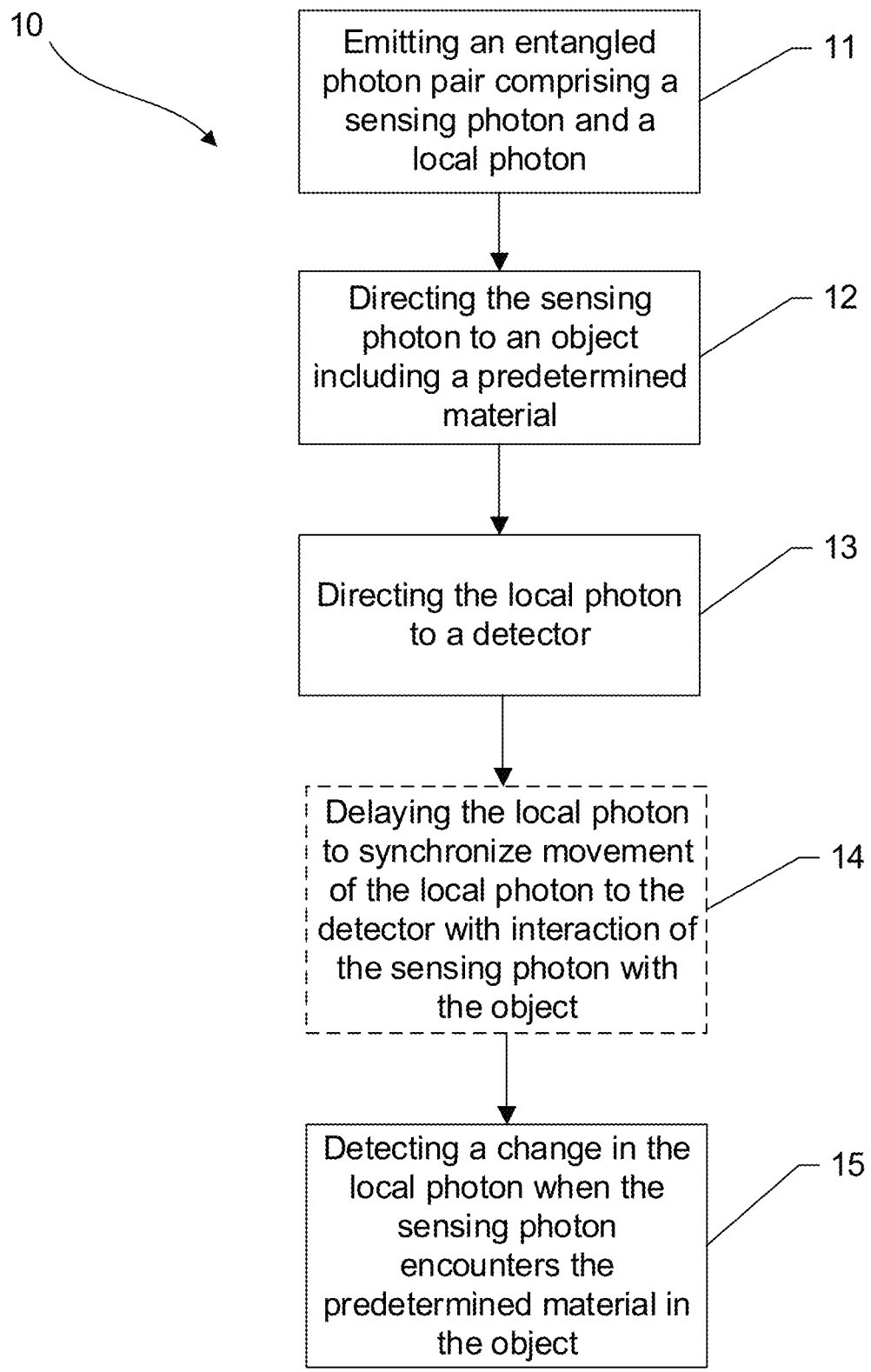
FIG. 2 is a block diagram of a method of detecting material in an object in accordance with certain embodiments of the invention.

Turning to the figures, FIG. 2 is a block diagram of a method of detecting material in an object in accordance with certain embodiments of the invention. As shown in FIG. 2, the method 10 may include emitting an entangled photon pair having a sensing photon and a local photon at operation 11, directing the sensing photon to an object including a predetermined material at operation 12, directing the local photon to a detector at operation 13, optionally delaying the local photon to synchronize movement of the local photon to the detector with interaction of the sensing photon with the object at operation 14, and detecting a change in the local photon when the sensing photon encounters the predetermined material in the object at operation 15.

According to certain embodiments, detecting the change in the local photon may indicate at least one of disentanglement and a change in photon energy distribution. For example, in some embodiments, the change in the local photon may indicate that the sensing photon was absorbed and/or scattered by the predetermined material. Indeed, as sensing photons encounter and interact with the environment along the directed path and change state accordingly, the onboard entangled photons (i.e. the local photons) also change state. The local photons are measured by an onboard detection system described in more detail below, with such measurements indicating the interaction and absorptions of the sensing photons because the sensing photons and local photons are entangled. In this way, the sensing photons are not directly measured. Because the sensing photons do not need to be directly measured, there is no need for a receiver on the platform, which reduces the size, weight, and power requirements of the system. Moreover, the sensing photons do not need to be energetic enough to reach the surface of the object (and therefore the predetermined material) and be reflected back to the platform, which further reduces the onboard power requirements for system operation.

In accordance with certain embodiments, emitting the entangled photon pair may comprise a repeating pulsed emission, a single pulsed emission, a steady stream emission, or some combination thereof. In some embodiments, the entangled photon pair may be emitted simultaneously. In further embodiments, multiple entangled photon pairs may be emitted either simultaneously or sequentially.

Figure 3:
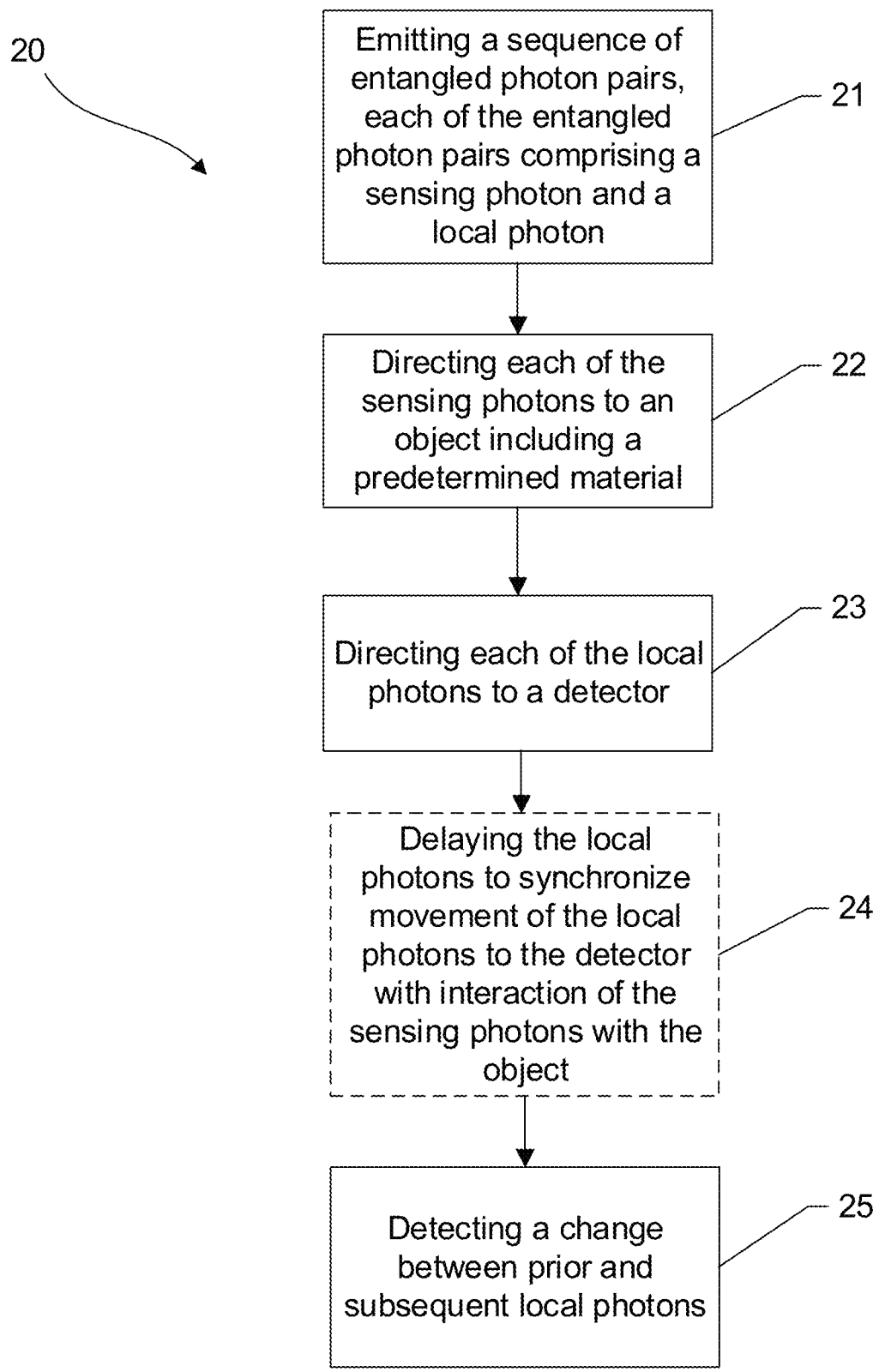
FIG. 3 is a block diagram of a method of detecting material in an object in accordance with certain embodiments of the invention.

FIG. 3, for example, is a block diagram of a method of detecting material in an object relying on sequential emission in accordance with certain embodiments of the invention. As shown in FIG. 3, the method 20 may include emitting a sequence of entangled photon pairs, each of the entangled photon pairs comprising a sensing photon and local photon, at operation 21, directing each of the sensing photons to an object including a predetermined material at operation 22, directing each of the local photons to a detector at operation 23, optionally delaying the local photons to synchronize movement of the local photons to the detector with interaction of the sensing photons with the object at operation 24, and detecting a change between prior and subsequent local photons at operation 25. In some embodiments, this sequential detection may be correlated to the direction of emission so that the location of the predetermined material within the object may be identified by scanning a two-dimensional pattern from two or more emission starting points when the object static and sufficiently close to the platform.

In accordance with a second aspect of the invention, another method of detecting material in an object is provided. The method includes emitting a target band entangled photon pair at a target wavelength in an absorption band for a predetermined material, the target band entangled photon pair comprising a target band sensing photon and a target band local photon; emitting a guard band entangled photon pair at a guard wavelength outside of the absorption band for the predetermined material, the guard band entangled photon pair comprising a guard band sensing photon and a guard band local photon; directing the target band sensing photon and the guard band sensing photon to the object including the predetermined material; directing the target band local photon to a target band detector and the guard band local photon to a guard band detector; and detecting any changes in the target band local photon and the guard band local photon when the target band sensing photon and the guard band sensing photon, respectively, encounter the predetermined material in the object. In such embodiments, the entangled photon pairs may be emitted simultaneously.

Figure 1:
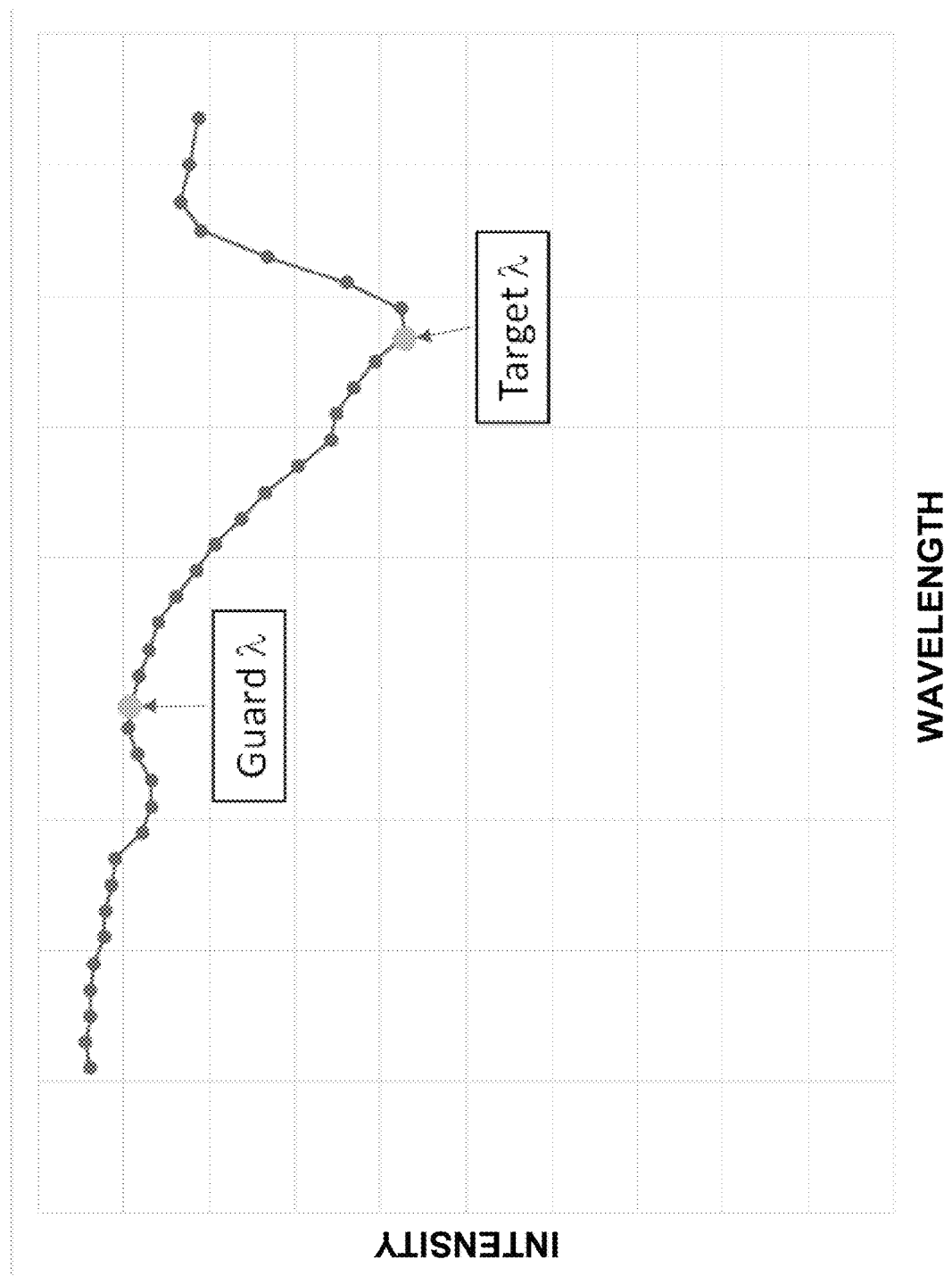
FIG. 1 shows an example of a target and guard wavelength arrangement in accordance with certain embodiments of the invention.

In order to reliably detect or identify a predetermined material, the energy at more than one wavelength position is measured. As discussed in more detail below with regard to at least FIGS. 4 and 6, the quantum entanglement-based detection system (QE-bDS) and methods of using the same incorporate at least two quantum entanglement-based sensor systems. A first sensor system operates at a wavelength position λT that indicates a diagnostic absorption feature of the predetermined material and is referred to as the target wavelength. The target wavelength is on-resonance for the predetermined material such that the target sensing photons scatter when they reach the predetermined material, and the resulting signal is collected. A second sensor system operates at a wavelength position λG that is outside of the absorption feature of the predetermined material and is referred to as the guard wavelength. The guard wavelength is off-resonance for the predetermined material, and no signal is collected. FIG. 1 shows an example of a target and guard wavelength arrangement in accordance with certain embodiments of the invention.

Figure 4:
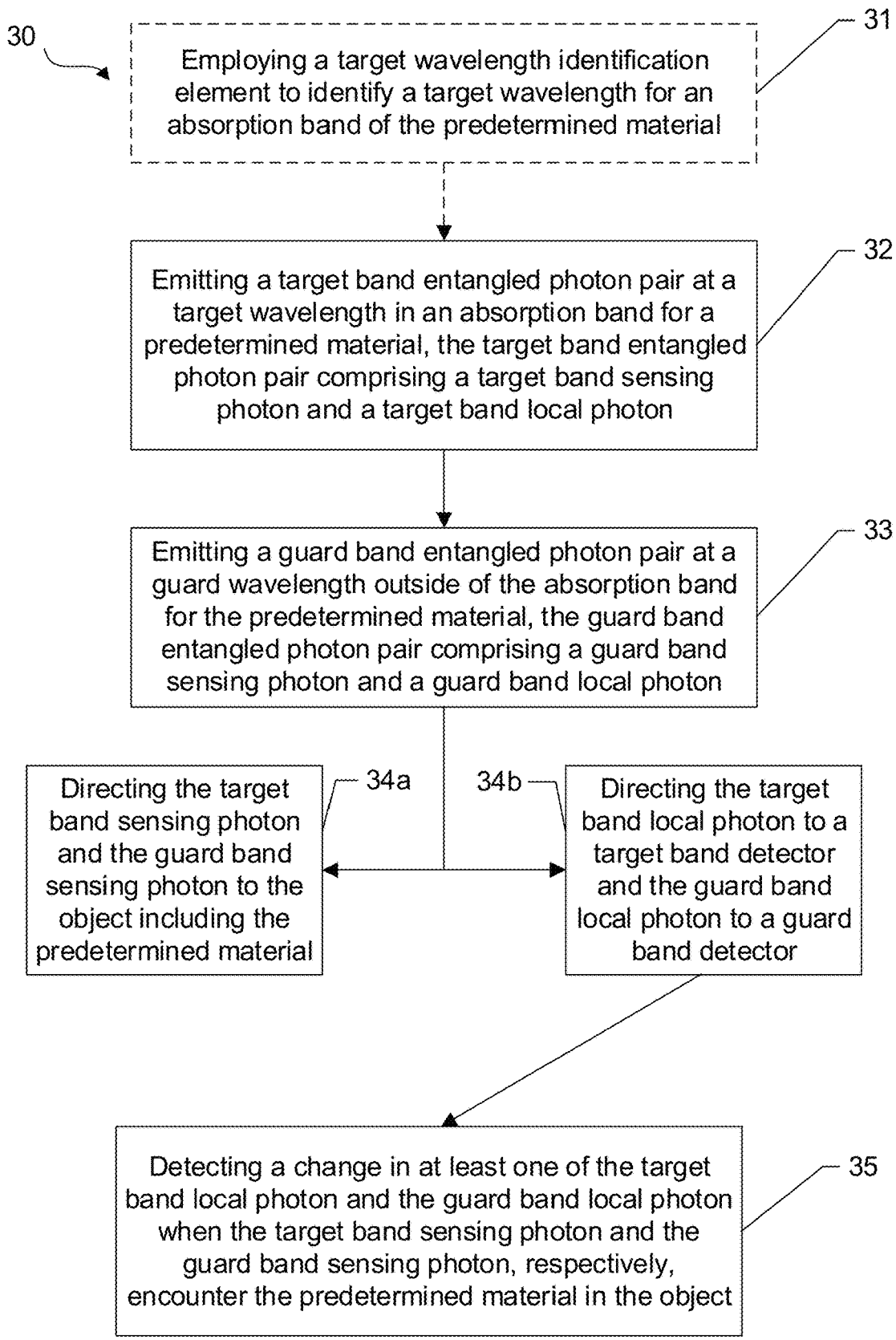
FIG. 4 is a block diagram of a method of detecting material in an object in accordance with certain embodiments of the invention.
Figure 5:
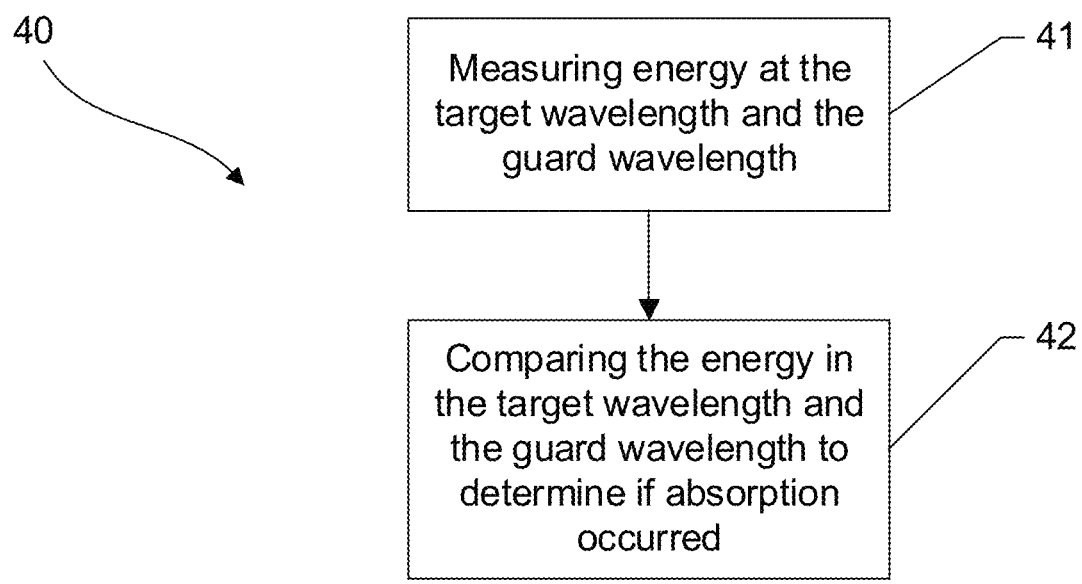
FIG. 5 is a block diagram of a method of detecting material in an object in accordance with certain embodiments of the invention.

FIG. 4 is a block diagram of another method of detecting material in an object in accordance with certain embodiments of the invention. As shown in FIG. 4, the method 30 may include optionally employing a target wavelength identification element to identify a target wavelength for an absorption band of the predetermined material at operation 31, emitting a target band entangled photon pair at the target wavelength in the absorption band for the predetermined material, the target band entangled photon pair comprising a target band sensing photon and a target band local photon at operation 32, emitting a guard band entangled photon pair at a guard wavelength outside of the absorption band for the predetermined material, the guard band entangled photon pair comprising a guard band sensing photon and a guard band local photon at operation 33, directing the target band sensing photon and the guard band sensing photon to the object including the predetermined material at operation 34a, directing the target band local photon to a target band detector and the guard band local photon to a guard band detector at operation 34b, and detecting a change in at least one of the target band local photon and the guard band local photon when the target band sensing photon and the guard band sensing photon, respectively, encounter the predetermined material in the object at operation 35. In some embodiments, and as shown in FIG. 5, detecting the changes in the target band local photon and the guard band local photon shown in operation 35 of FIG. 4 may include, in method 40, measuring energy at the target wavelength and the guard wavelength at operation 41, and comparing the energy in the target wavelength and the guard wavelength to determine if absorption occurred at operation 42. Measuring energy comprises measuring the quantum state of the local photons.

In accordance with a third aspect of the invention, a detection system is provided. The detection system includes a target band entangled photon pair emitter configured to emit a target band sensing photon and a target band local photon, the target band sensing photon being directed to an object; and a target band detector configured to receive the target band local photon and output a signal when the target band local photon indicates that the target band sensing photon has encountered a predetermined material in the object.

Figure 6:
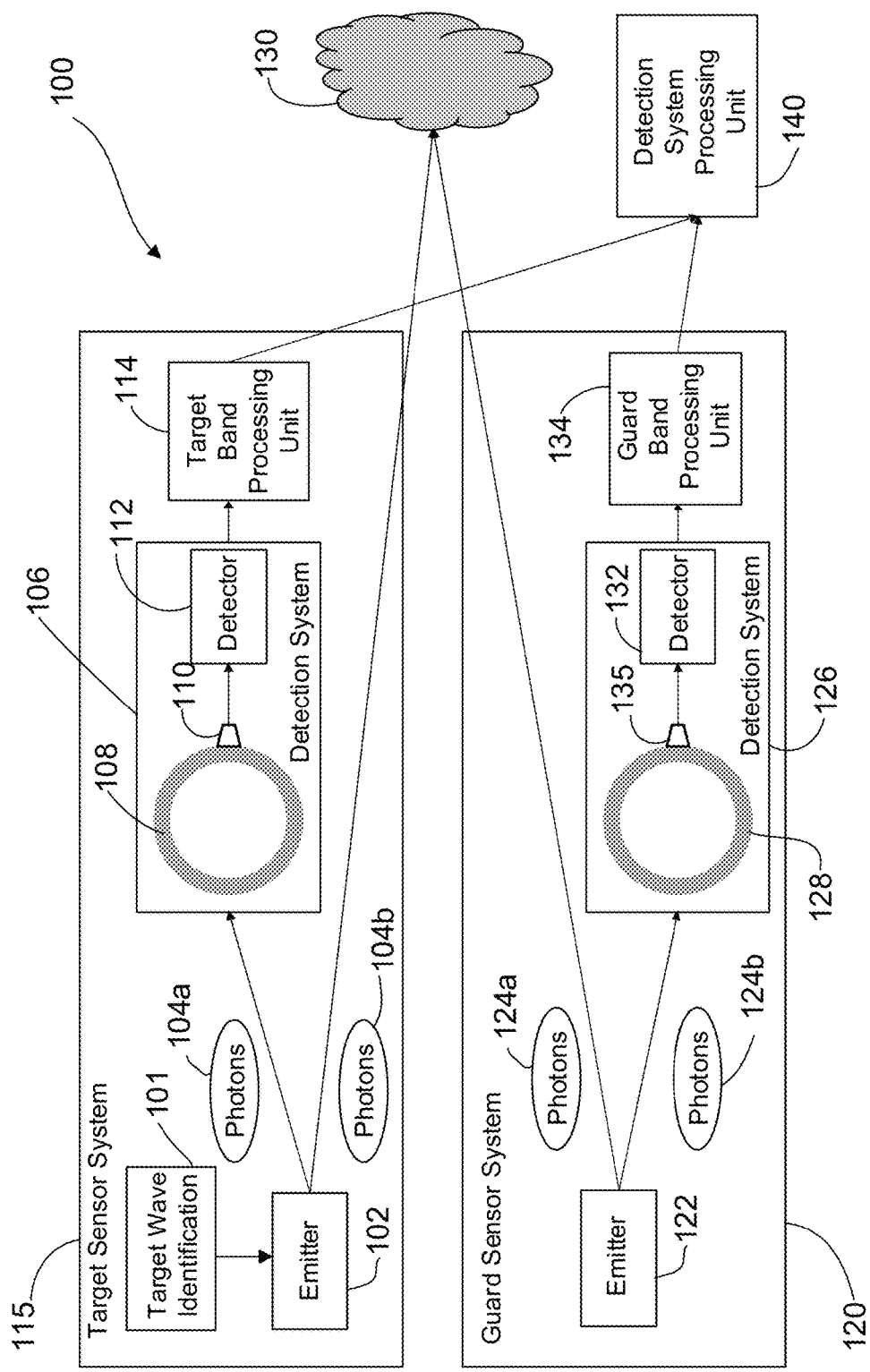
FIG. 6 illustrates a detection system in accordance with certain embodiments of the invention.

FIG. 6 illustrates a detection system in accordance with certain embodiments of the invention. As shown in FIG. 6, the detection system 100 may include a target sensor system 115, a guard sensor system 120, and a detection system processing unit 140 configured to detect a predetermined material 130 in an object.

The target sensor system 115 may include a target band entangled photon pair emitter 102 that emits target band local photons 104a (i.e. the half of the entangled pairs that is kept onboard a platform) and target band sensing photons 104b (i.e. the half of the entangled pairs that is sent on the measurement trajectory towards the area that will be interrogated for the presence of the predetermined material 130). The target band local photons 104a are sent to the onboard target band detection system 106, which may include a target band delay element 108, an exit gate 110, and a target band detector 112. The exit gate 110 allows photons 104a to release at regular intervals from the target band delay element 108 and enter the target band detector 112. Data from the target band detector 112 is then sent to the target band processing unit 114 to process the target band local photon data and accumulate the photon count statistics for each time interval. The target band processing unit 114 may also calibrate the data.

The guard sensor system 120 may include a guard band entangled photon pair emitter 122 that emits guard band sensing photons 124a (i.e. the half of the entangled pairs that is sent on the measurement trajectory towards the area that will be interrogated for the presence of the predetermined material 130) and guard band local photons 124b (i.e. the half of the entangled pairs that is kept onboard a platform). As discussed previously herein, the target band entangled photon pair emitter 102 and the guard band entangled photon pair emitter 122 may be configured to emit the target band entangled photon pair and the guard band entangled photon pair simultaneously. The guard band local photons 124b are sent to the onboard guard band detection system 126, which may include a guard band delay element 128, an exit gate 135, and a guard band detector 132. The exit gate 135 allows photons 124b to release at regular intervals from the guard band delay element 128 and enter the guard band detector 132. Data from the guard band detector 132 then sent to the guard band processing unit 134 to process the guard band local photon data and accumulate the photon count statistics for each time interval. The guard band processing unit 134 may also calibrate the data.

Processed results from target sensor system 115 and guard sensor system 120 may then be sent to the detection system processing unit 140. Detection system processing unit 140 may then quantitatively compare the target and guard results and determine if a detection of the predetermined material 130 has occurred. Detection system processing unit 140 may also quantitatively assess the reliability of the detection. Specifically, the detection system processing unit 140 makes a differential comparison of the data from the target band processing unit 114 and the guard band processing unit 134, which eliminates the need for precise calibration.

In some embodiments, the identity of the predetermined material (and therefore target wavelength) may be known. In other embodiments, however, the identity of the predetermined material (and the target wavelength) may be unknown. In such embodiments, the detection system may include a target wavelength identification element 101 configured to identify the target wavelength for the absorption band of the predetermined material when the target wavelength is unknown. For example, the target wavelength identification element 101 may comprise a pair of tunable lasers configured to identify the appropriate frequencies for the predetermined material.

Because the transit time for the sensing photons from the platform or ground station to the area where the predetermined material may potentially be detected is longer than the transit time for the local photons within the platform or ground stations, the detection system may use a time delay in the measurement of the local photons. As such, and as discussed previously herein, the detection system may include a target band delay element and/or a guard band delay element. The target band delay element may be configured to delay the target band local photon to synchronize movement of the target band local photon to the target band detector with interaction of the target band sensing photon with the object. Similarly, the guard band delay element may be configured to delay the guard band local photon to synchronize movement of the guard band local photon to the guard band detector with interaction of the guard band sensing photon with the objection. In some embodiments, the target band delay element and/or the guard band delay element may be an annulus delay element. For example, in such embodiments, entangled photon pairs leave the system at the same time, and the local photons enter an annulus time delay element that reflects the local photons around a mirrored surface. At certain time intervals, a subset of the local photons are made to exit the annulus time delay element via a door in the annulus and then directed to the onboard measurement system (e.g., target band detector 112). In other embodiments, the target band delay element and/or the guard band delay element may be a fiber optic cable.

Figure 10:
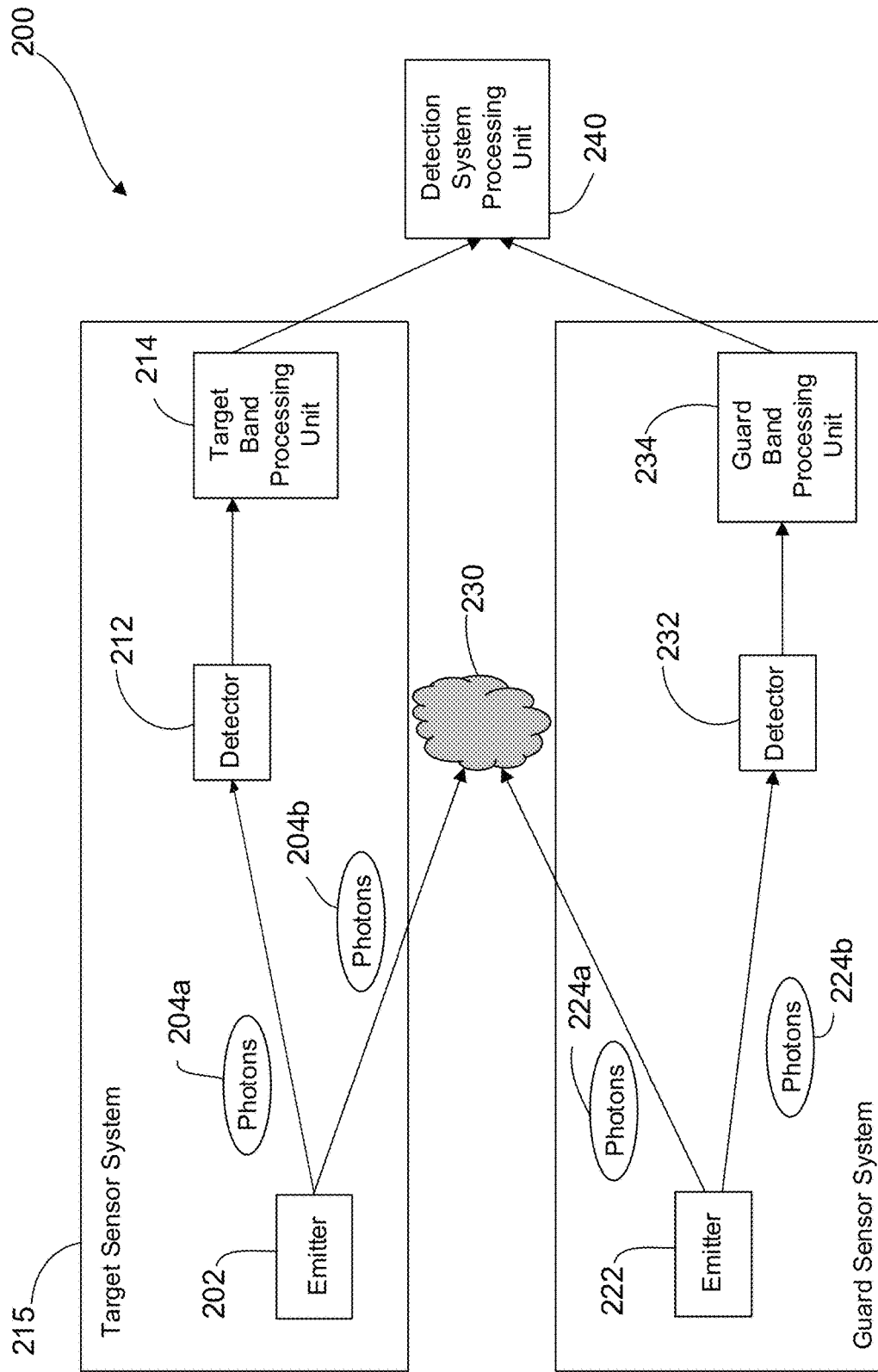
FIG. 10 illustrates a detection system in accordance with certain embodiments of the invention.

In other embodiments, such as that shown in FIG. 10, the target (and therefore predetermined material), the target band detector, and the guard band detector are at the same distance. In such embodiments, no delay circuit may be required. As shown in FIG. 10, the detection system 200 may include a target sensor system 215, a guard sensor system 220, and a detection system processing unit 240 configured to detect a predetermined material 230 in an object.

The target sensor system 215 may include a target band entangled photon pair emitter 202 that emits target band local photons 204a and target band sensing photons 204b. The target band local photons 204a are sent to the target band detector 212. Data from the target band detector 212 is then sent to the target band processing unit 214 to process the target band local photon data and accumulate the photon count statistics for each time interval.

The guard sensor system 220 may include a guard band entangled photon pair emitter 222 that emits guard band sensing photons 224a and guard band local photons 224b. The guard band local photons 224b are sent to the guard band detector 232. Data from the guard band detector 232 is then sent to the guard band processing unit 234 to process the guard band local photon data and accumulate the photon count statistics for each time interval.

Processed results from target sensor system 215 and guard sensor system 220 may then be sent to the detection system processing unit 240. Detection system processing unit 240 may then quantitatively compare the target and guard results and determine if a detection of the predetermined material 230 has occurred. Detection system processing unit 240 may also quantitatively assess the reliability of the detection.

Figure 11:
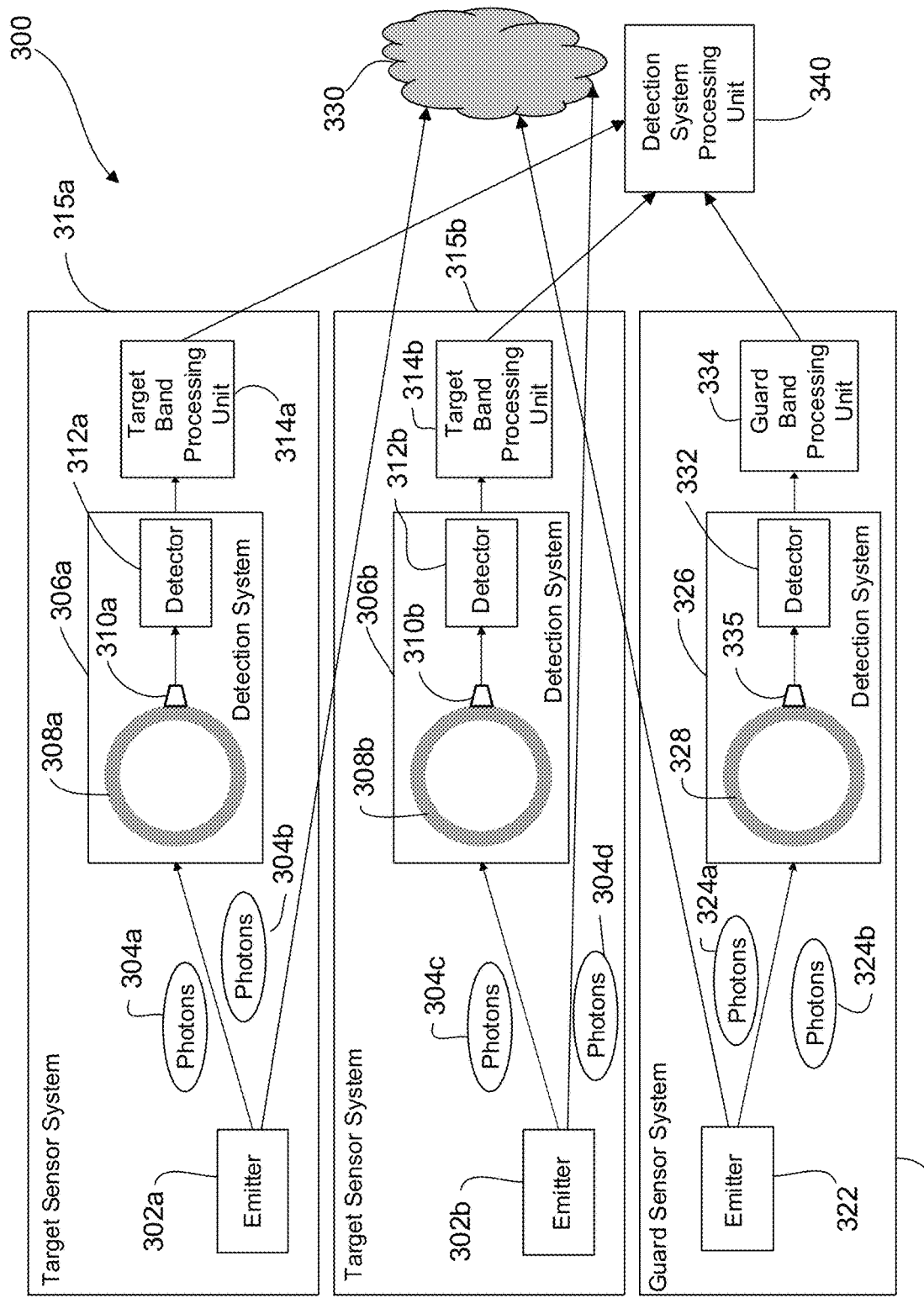
FIG. 11 illustrates a detection system in accordance with certain embodiments of the invention.

In further embodiments, such as that shown in FIG. 11, the detection system may be used to detect, identify, and quantify a gas cloud. In such embodiments, the detection system may include a second target sensor system to supply a second beam of target band sensing photons to penetrate a potential gas cloud at a different depth than the first beam of target band sensing photons. For example, as shown in FIG. 11, the detection system 300 may include a first target sensor system 315a, a second target sensor system 315b, a guard sensor system 320, and a detection system processing unit 340 configured to detect a predetermined material 330 in an object.

The first target sensor system 315a may include a first target band entangled photon pair emitter 302a that emits first target band local photons 304a and first target band sensing photons 304b. The first target band local photons 304a are sent to the onboard first target band detection system 306a, which may include a first target band delay element 308a, a first exit gate 310a, and a first target band detector 312a. The first exit gate 310a allows photons 304a to release at regular intervals from the first target band delay element 308a and enter the first target band detector 312a. Data from the first target band detector 312a is then sent to the first target band processing unit 314a to process the target band local photon data and accumulate the photon count statistics for each time interval.

The second target sensor system 315b may include a second target band entangled photon pair emitter 302b that emits second target band local photons 304c and second target band sensing photons 304d. The second target band local photons 304c are sent to the onboard second target band detection system 306b, which may include a second target band delay element 308b, a second exit gate 310b, and a second target band detector 312b. The second exit gate 310b allows photons 304c to release at regular intervals from the second target band delay element 308b and enter the second target band detector 312b. Data from the second target band detector 312b is then sent to the second target band processing unit 314b to process the target band local photon data and accumulate the photon count statistics for each time interval.

The guard sensor system 320 may include a guard band entangled photon pair emitter 322 that emits guard band sensing photons 324a and guard band local photons 324b. The guard band local photons 324b are sent to the onboard guard band detection system 326, which may include a guard band delay element 328, an exit gate 335, and a guard band detector 332. The exit gate 335 allows photons 324b to release at regular intervals from the guard band delay element 328 and enter the guard band detector 332. Data from the guard band detector 332 then sent to the guard band processing unit 334 to process the guard band local photon data and accumulate the photon count statistics for each time interval.

Processed results from first target sensor system 315a, second target sensor system 315b, and guard sensor system 320 may then be sent to the detection system processing unit 340. Detection system processing unit 340 may then quantitatively compare the target and guard results and determine if a detection of the predetermined material 330 has occurred. Detection system processing unit 340 may also quantitatively assess the reliability of the detection.

Figure 12:
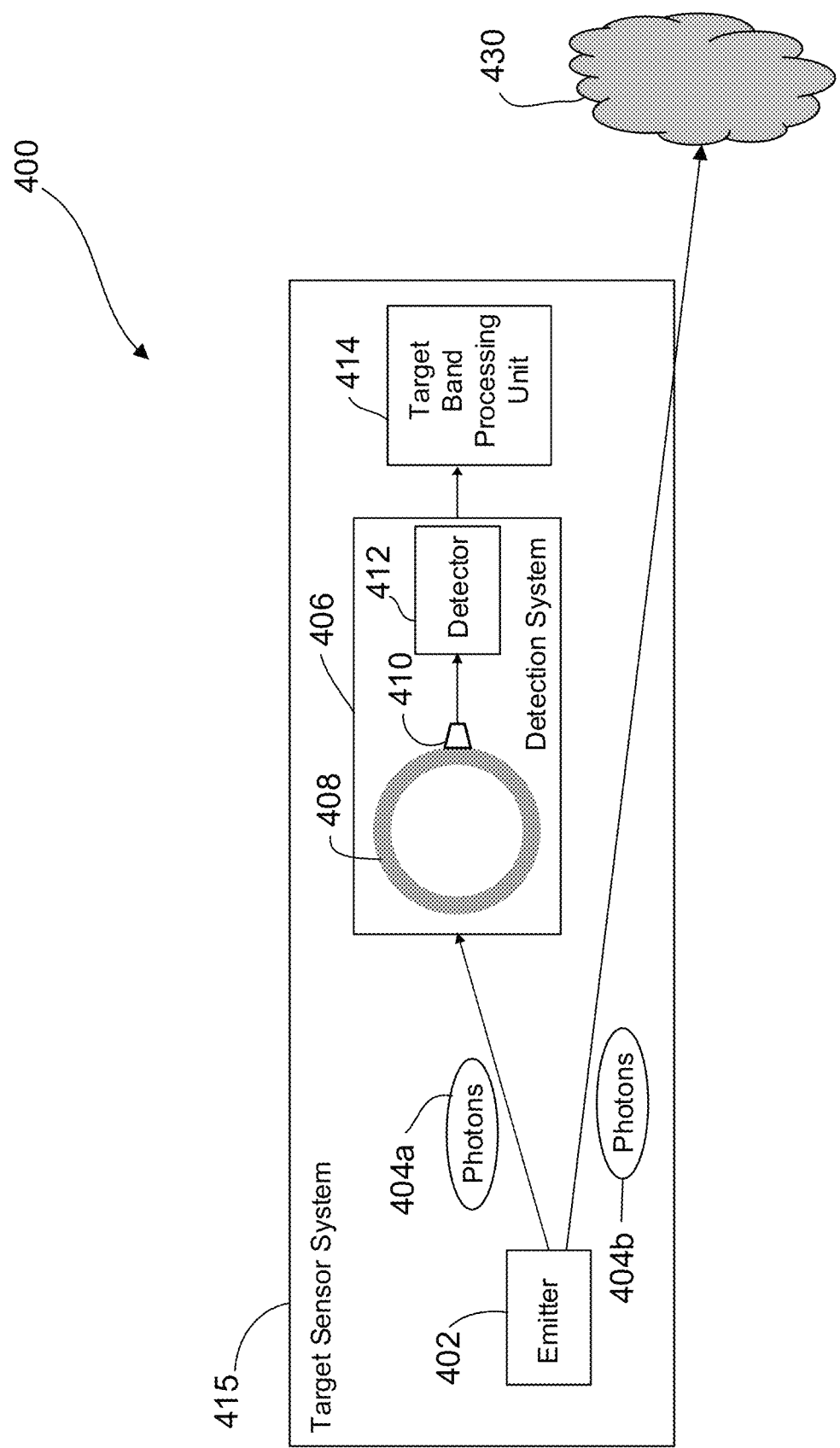
FIG. 12 illustrates a detection system in accordance with certain embodiments of the invention.

According to certain embodiments, such as that shown in FIG. 12, the detection system may be used to detect, identify, and quantify ice on space objects. In such embodiments, the detection system may only include a target sensor system without a guard sensor system. For example, as shown in FIG. 12, the detection system 400 may include a target sensor system 415 and a target band processing unit 414 configured to detect a predetermined material 430 in an object.

The target sensor system 415 may include a target band entangled photon pair emitter 402 that emits target band local photons 404a and target band sensing photons 404b. The target band local photons 404a are sent to the onboard target band detection system 406, which may include a target band delay element 408, an exit gate 410, and a target band detector 412. The exit gate 410 allows photons 404a to release at regular intervals from the target band delay element 408 and enter the target band detector 412. Data from the target band detector 412 is then sent to the target band processing unit 414 to process the target band local photon data and accumulate the photon count statistics for each time interval.

This detection system 400 may rely on Ku (12.6 GHz) and/or C (4.2 GHz) bands to take advantage of the fact that while reflection of radar waves on a planetary surface causes a polarization change, ice does not cause a polarization change. Specifically, ice is transparent to radio energy and multiply scatters the pulses, which may lead to an enhancement in same sense reflections.

In other embodiments in which the detection system may be used to detect, identify, and quantify ice on space objects, the detection system may be configured like the embodiment illustrated in FIG. 6. In such embodiments, the detection system may use lasers in near-infrared (NIR) bands in the water-ice reflectance spectrum. For measurements, the detection system may utilize reflectance measurement or light detection and ranging (LIDAR).

Figure 7:
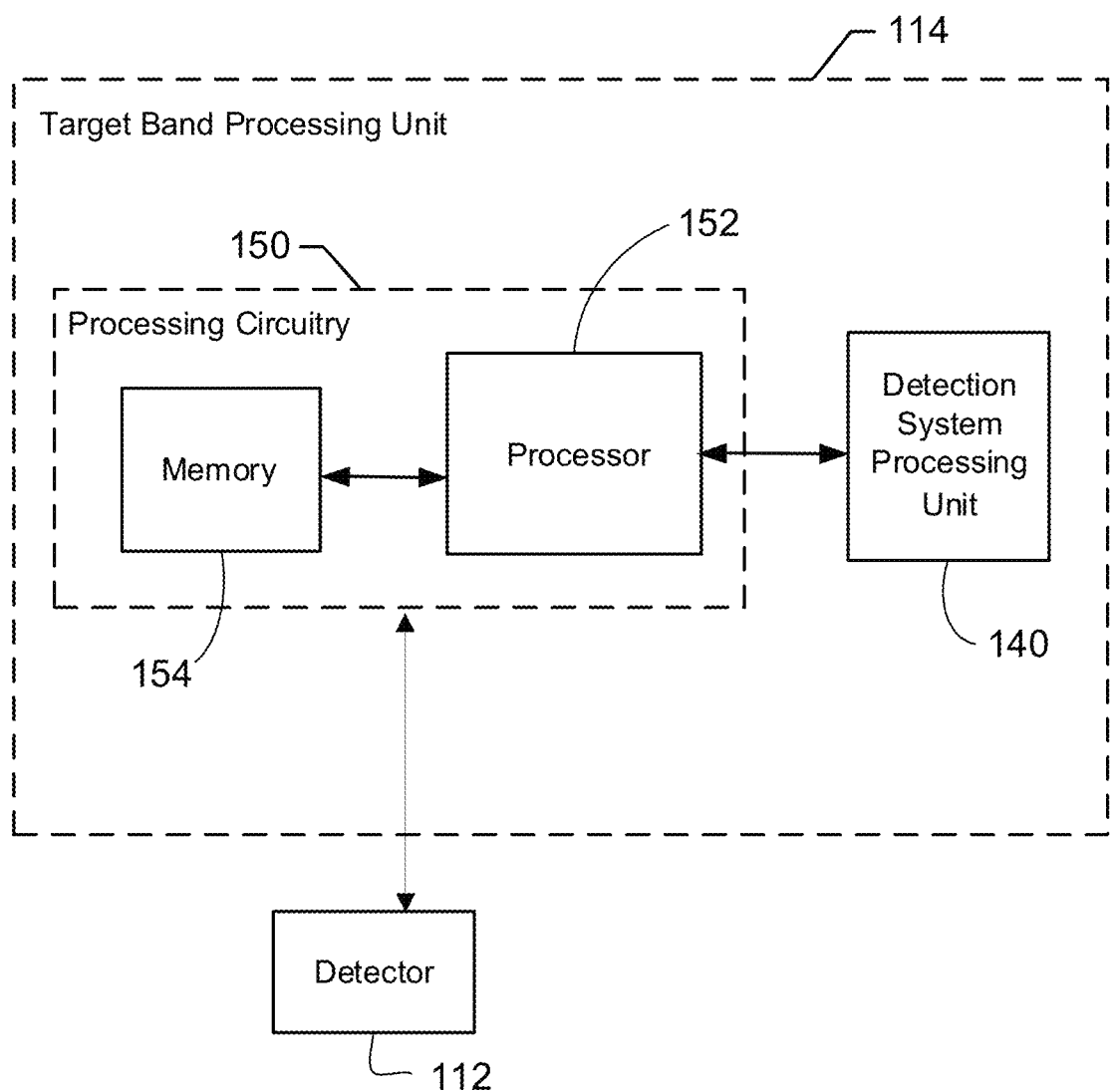
FIG. 7 is a block diagram of a processing unit in a target sensor system in accordance with certain embodiments of the invention.
Figure 8:
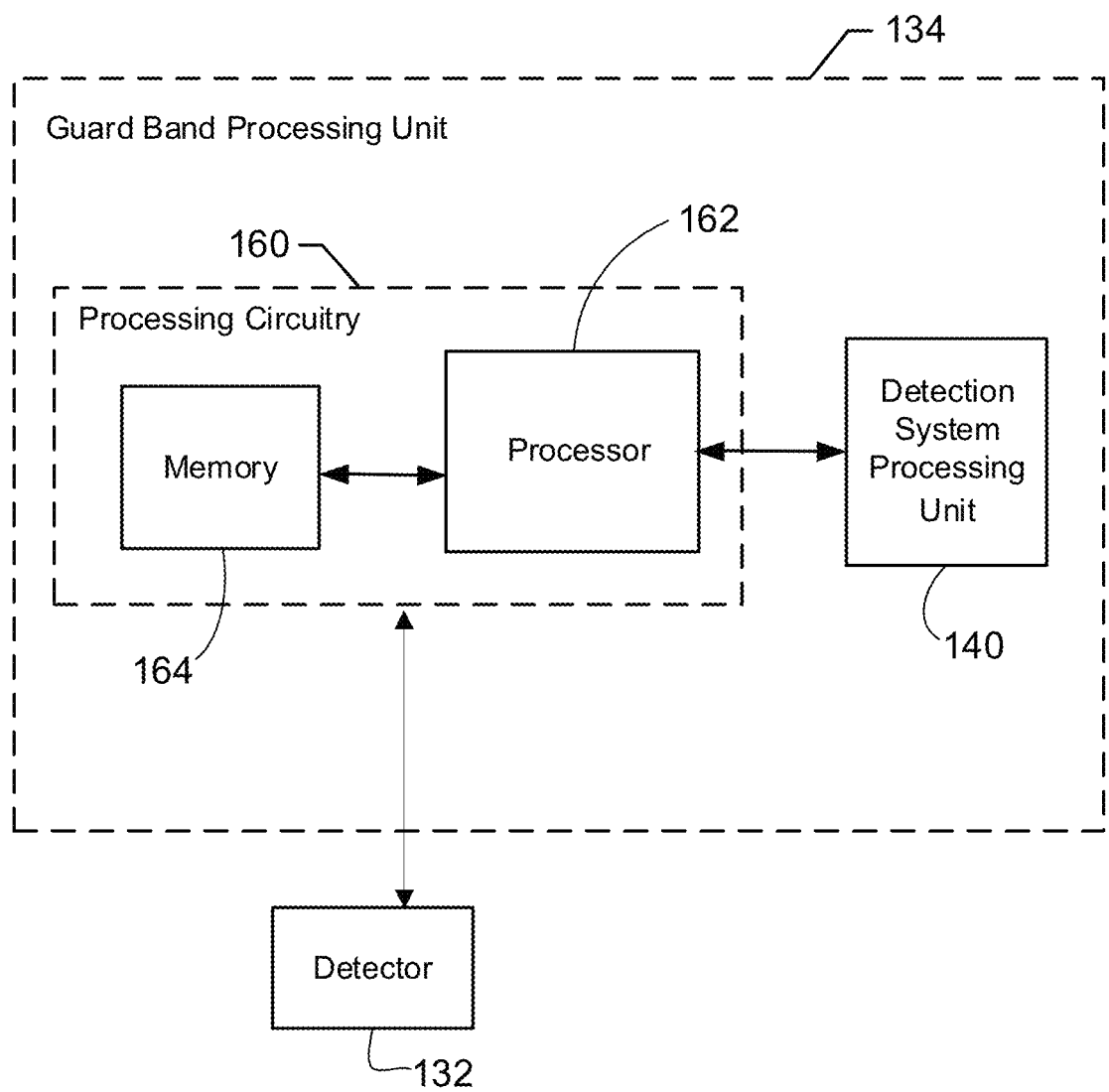
FIG. 8 is a block diagram of a processing unit in a guard sensor system in accordance with certain embodiments of the invention.
Figure 9:
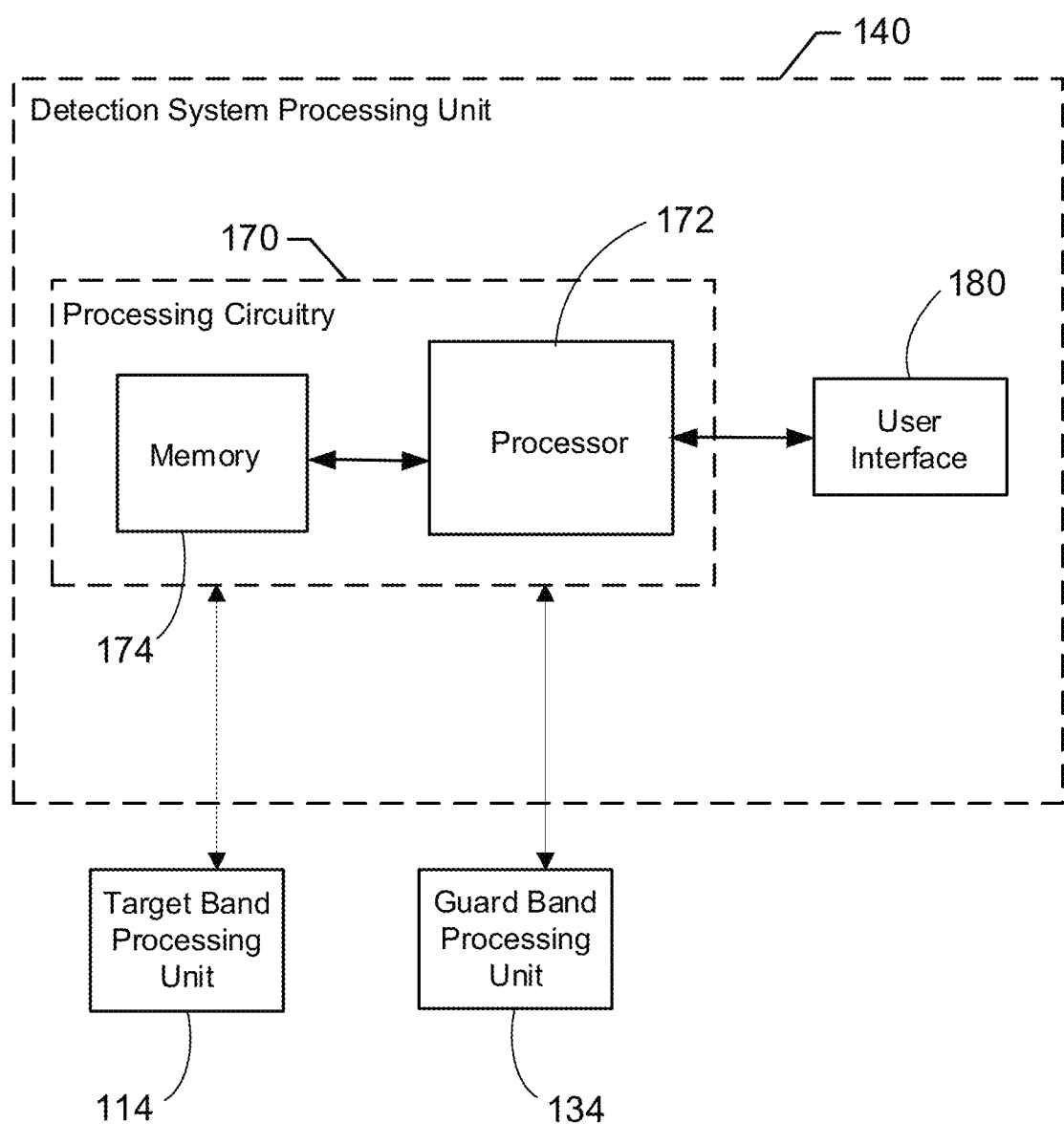
FIG. 9 is a block diagram of a processing unit in a detection system in accordance with certain embodiments of the invention.

FIGS. 7, 8, and 9 illustrate various processing units of the detection system 100. For example, FIG. 7 is a block diagram of the target band processing unit 114 in accordance with certain embodiments of the invention. As shown in FIG. 7, the target band processing unit 114 may include processing circuitry 150 that may be configured to interface with, control, or otherwise coordinate the operations of various components of the target band processing unit 114 in connection with detecting material in an object.

In some embodiments, the processing circuitry 150 may be embodied as a chip or chip set. In other words, the processing circuitry 150 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 150 may therefore, in some cases, be configured to implement an embodiment of the present invention on a single chip or as a single "system on a chip." As such, in some cases, a chip or chipset may constitute means for performing one or more operations for providing the functionalities described herein.

According to certain embodiments, the processing circuitry 150 may include one or more instances of a processor 152 and memory 154 that may be in communication with detection system processing unit 140. As such, the processing circuitry 150 may be embodied as a circuit chip (e.g., an integrated circuit chip) configured (e.g., with hardware, software or a combination of hardware and software) to perform operations described herein.

In some cases, the detection system processing unit 140, which is described in more detail below with regard to FIG. 9, may be any means such as a device or circuitry embodied in either hardware, or a combination of hardware and software that is configured to receive and/or transmit data from/to devices or components in communication with the processing circuitry 150 via internal and/or external communication mechanisms. Accordingly, for example, the detection system processing unit 140 may further include wired and/or wireless communication equipment for at least communicating with the target band processing unit 114, and/or other components or modules described herein.

The processor 152 may be embodied in a number of different ways. For example, the processor 152 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 152 may be configured to execute instructions stored in the memory 154 or otherwise accessible to the processor 152. As such, whether configured by hardware or by a combination of hardware and software, the processor 152 may represent an entity (e.g., physically embodied in circuitry—in the form of processing circuitry 150) capable of performing operations according to embodiments of the present invention while configured accordingly. Thus, for example, when the processor 152 is embodied as an ASIC, FPGA or the like, the processor 152 may be specifically configured hardware for conducting the operations described herein. Alternatively, as another example, when the processor 152 is embodied as an executor of software instructions, the instructions may specifically configure the processor 152 to perform the operations described herein in reference to execution of an example embodiment.

In some embodiments, the memory 154 may include one or more non-transitory memory devices such as, for example, volatile and/or non-volatile memory that may be either fixed or removable. The memory 154 may be configured to store information, data, applications, instructions or the like for enabling the processing circuitry 150 to carry out various functions in accordance with exemplary embodiments of the present invention. For example, the memory 154 may be configured to buffer input data for processing by the processor 152. Additionally or alternatively, the memory 154 may be configured to store instructions for execution by the processor 152. As yet another alternative or additional capability, the memory 154 may include one or more databases that may store or buffer a variety of data sets or tables useful for operation of the modules described below and/or the processing circuitry 150. Among the contents of the memory 154, applications or instruction sets may be stored for execution by the processor 152 in order to carry out the functionality associated with each respective application or instruction set. In particular, the memory 154 may store executable instructions that enable the computational power of the processing circuitry 150 to be employed to improve the functioning of the target band processing unit 114 as described herein. As such, the improved operation of the computational components of the target band processing unit 114 transforms the target band processing unit 114 into a more capable tool for detecting material in an object as described herein. In this regard, target band detector 112 may provide data to the components described above to facilitate execution of the functions described above, and/or any other functions that the components may be configurable to perform.

Similarly, FIG. 8 is a block diagram of the guard band processing unit 134 in accordance with certain embodiments of the invention. As shown in FIG. 8, the guard band processing unit 134 may include processing circuitry 160 that may be configured to interface with, control, or otherwise coordinate the operations of various components of the guard band processing unit 134 in connection with detecting material in an object.

In some embodiments, the processing circuitry 160 may be embodied as a chip or chip set. In other words, the processing circuitry 160 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 160 may therefore, in some cases, be configured to implement an embodiment of the present invention on a single chip or as a single "system on a chip." As such, in some cases, a chip or chipset may constitute means for performing one or more operations for providing the functionalities described herein.

According to certain embodiments, the processing circuitry 160 may include one or more instances of a processor 162 and memory 164 that may be in communication with detection system processing unit 140. As such, the processing circuitry 160 may be embodied as a circuit chip (e.g., an integrated circuit chip) configured (e.g., with hardware, software or a combination of hardware and software) to perform operations described herein.

In some cases, the detection system processing unit 140, which is described in more detail below with regard to FIG. 9, may be any means such as a device or circuitry embodied in either hardware, or a combination of hardware and software that is configured to receive and/or transmit data from/to devices or components in communication with the processing circuitry 160 via internal and/or external communication mechanisms. Accordingly, for example, the detection system processing unit 140 may further include wired and/or wireless communication equipment for at least communicating with the guard band processing unit 134, and/or other components or modules described herein.

The processor 162 may be embodied in a number of different ways. For example, the processor 162 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 162 may be configured to execute instructions stored in the memory 164 or otherwise accessible to the processor 162. As such, whether configured by hardware or by a combination of hardware and software, the processor 162 may represent an entity (e.g., physically embodied in circuitry—in the form of processing circuitry 160) capable of performing operations according to embodiments of the present invention while configured accordingly. Thus, for example, when the processor 162 is embodied as an ASIC, FPGA or the like, the processor 162 may be specifically configured hardware for conducting the operations described herein. Alternatively, as another example, when the processor 162 is embodied as an executor of software instructions, the instructions may specifically configure the processor 162 to perform the operations described herein in reference to execution of an example embodiment.

In some embodiments, the memory 164 may include one or more non-transitory memory devices such as, for example, volatile and/or non-volatile memory that may be either fixed or removable. The memory 164 may be configured to store information, data, applications, instructions or the like for enabling the processing circuitry 160 to carry out various functions in accordance with exemplary embodiments of the present invention. For example, the memory 164 may be configured to buffer input data for processing by the processor 162. Additionally or alternatively, the memory 164 may be configured to store instructions for execution by the processor 162. As yet another alternative or additional capability, the memory 164 may include one or more databases that may store or buffer a variety of data sets or tables useful for operation of the modules described below and/or the processing circuitry 160. Among the contents of the memory 164, applications or instruction sets may be stored for execution by the processor 162 in order to carry out the functionality associated with each respective application or instruction set. In particular, the memory 164 may store executable instructions that enable the computational power of the processing circuitry 160 to be employed to improve the functioning of the guard band processing unit 134 as described herein. As such, the improved operation of the computational components of the guard band processing unit 134 transforms the guard band processing unit 134 into a more capable tool for detecting material in an object as described herein. In this regard, guard band detector 132 may provide data to the components described above to facilitate execution of the functions described above, and/or any other functions that the components may be configurable to perform.

Further, FIG. 9 is a block diagram of the detection system processing unit 140 in accordance with certain embodiments of the invention. As shown in FIG. 9, the detection system processing unit 140 may include processing circuitry 170 that may be configured to interface with, control, or otherwise coordinate the operations of various components of the detection system processing unit 140 in connection with detecting material in an object.

In some embodiments, the processing circuitry 170 may be embodied as a chip or chip set. In other words, the processing circuitry 170 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 170 may therefore, in some cases, be configured to implement an embodiment of the present invention on a single chip or as a single "system on a chip." As such, in some cases, a chip or chipset may constitute means for performing one or more operations for providing the functionalities described herein.

According to certain embodiments, the processing circuitry 170 may include one or more instances of a processor 172 and memory 174 that may be in communication with or otherwise control a user interface 180. As such, the processing circuitry 170 may be embodied as a circuit chip (e.g., an integrated circuit chip) configured (e.g., with hardware, software or a combination of hardware and software) to perform operations described herein.

The user interface 180 may include one or more interface mechanisms or devices for enabling communication with a user (e.g., a laptop computer). In some cases, the user interface 180 may be any means such as a device or circuitry embodied in either hardware, or a combination of hardware and software that is configured to receive and/or transmit data from/to devices or components in communication with the processing circuitry 170 via internal and/or external communication mechanisms. Accordingly, for example, the user interface 180 may further include wired and/or wireless communication equipment for at least communicating with the detection system processing unit 140, and/or other components or modules described herein.

The processor 172 may be embodied in a number of different ways. For example, the processor 172 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 172 may be configured to execute instructions stored in the memory 174 or otherwise accessible to the processor 172. As such, whether configured by hardware or by a combination of hardware and software, the processor 172 may represent an entity (e.g., physically embodied in circuitry—in the form of processing circuitry 170) capable of performing operations according to embodiments of the present invention while configured accordingly. Thus, for example, when the processor 172 is embodied as an ASIC, FPGA or the like, the processor 172 may be specifically configured hardware for conducting the operations described herein. Alternatively, as another example, when the processor 172 is embodied as an executor of software instructions, the instructions may specifically configure the processor 172 to perform the operations described herein in reference to execution of an example embodiment.

In some embodiments, the memory 174 may include one or more non-transitory memory devices such as, for example, volatile and/or non-volatile memory that may be either fixed or removable. The memory 174 may be configured to store information, data, applications, instructions or the like for enabling the processing circuitry 170 to carry out various functions in accordance with exemplary embodiments of the present invention. For example, the memory 174 may be configured to buffer input data for processing by the processor 172. Additionally or alternatively, the memory 174 may be configured to store instructions for execution by the processor 172. As yet another alternative or additional capability, the memory 174 may include one or more databases that may store or buffer a variety of data sets or tables useful for operation of the modules described below and/or the processing circuitry 170. Among the contents of the memory 174, applications or instruction sets may be stored for execution by the processor 172 in order to carry out the functionality associated with each respective application or instruction set. In particular, the memory 174 may store executable instructions that enable the computational power of the processing circuitry 170 to be employed to improve the functioning of the detection system processing unit 140 as described herein. As such, the improved operation of the computational components of the detection system processing unit 140 transforms the detection system processing unit 140 into a more capable tool for detecting material in an object as described herein. In this regard, target band processing unit 114 and guard band processing unit 134 may provide data to the components described above to facilitate execution of the functions described above, and/or any other functions that the components may be configurable to perform.

According to certain embodiments, the target band entangled photon pair emitter and the guard band entangled photon pair emitter may be disposed on a moving platform. In some embodiments, one or more of the target sensor system, the target band processing unit, the guard sensor system, the guard band processing unit, and/or the detection system processing unit may also be disposed on the moving platform. The moving platform may be, for example, an aircraft, a spacecraft (e.g., a satellite), a watercraft, or a land vehicle. In other embodiments, however, one or more of the target band entangled photon pair emitter, the guard band entangled photon pair emitter the target sensor system, the target band processing unit, the guard sensor system, the guard band processing unit, and/or the detection system processing unit may be disposed in a ground station.

In accordance with certain embodiments, the target band entangled photon pair emitter and the guard band entangled photon pair emitter may comprise a laser or another active-based source. In some embodiments, the emitters may emit photons at various wavelengths depending on the target predetermined material. For example, in certain embodiments, the detection system may utilize an electro-optical/infrared (EO/IR) system. EO/IR systems may be used, for instance, in various "detect, identify, and quantify" (DIQ) and metrology operations. Examples of DIQ operations are gas cloud characterization, as discussed previously herein with respect to FIG. 11, and surface target characterization.

Examples of metrology operations are measuring cloud extent and measuring the distance to an object. In further embodiments, EO/IR systems may be used in feasibility studies, such as in laboratory evaluation.

In other embodiments, the detection system may utilize radar. Radar may be used, for instance, in various DIQ operations, including those directed to terrestrial subsurface water and ice and ice on space objects.

In some embodiments, the detection system may utilize microwaves, for example, in altimetry studies. For instance, microwaves (e.g., a Ku band at 13.6 GHz and a C band at 5.3 GHz) may be used to measure sea surface height. In such embodiments, the Ku and C band microwaves may reflect off the sea surface with different travel times.

In further embodiments, the detection system may utilize very low frequency wavelengths (i.e. radio frequencies (RF) in the range of 3-30 kHz). Very low frequency wavelengths may be used, for example, in DIQ operations, including those directed to submarine presence and distance.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A detection system comprising:
   a target band entangled photon pair emitter configured to emit a target band sensing photon and a target band local photon, the target band sensing photon being directed to an object;
   a target band detector configured to receive the target band local photon and output a signal when the target band local photon indicates that the target band sensing photon has encountered a predetermined material in the object;
   a guard band entangled photon pair emitter configured to emit a guard band sensing photon and a guard band local photon at a guard wavelength, the guard band sensing photon being directed to the object; and
   a guard band detector configured to receive the guard band local photon and output a signal if the guard band local photon indicates any changes in the guard band sensing photon,
   wherein the guard wavelength is outside an absorption band for the predetermined material.

2. The detection system according to claim 1, further comprising:
   a target band delay element configured to delay the target band local photon to synchronize movement of the target band local photon to the target band detector with interaction of the target band sensing photon with the object; and
   a guard band delay element configured to delay the guard band local photon to synchronize movement of the guard band local photon to the guard band detector with interaction of the guard band sensing photon with the object.

3. The detection system according to claim 2, further comprising a target exit gate, the target exit gate configured to release target band local photons at regular intervals from the target band delay element.

4. The detection system according to claim 2, further comprising a guard exit gate, the guard exit gate configured to release guard band local photons at regular intervals from the guard band delay element.

5. The detection system according to claim 2, wherein the target band delay element and the guard band delay element each comprise an annulus delay element or a fiber optic cable.

6. The detection system according to claim 5, wherein the annulus delay element is structured to reflect the target band local photons or the guard band local photons around a mirrored surface and at certain time intervals, eject a subset of the target band local photons or the guard band local photons from the annulus delay element via a door in the annulus delay element.

7. The detection system according to claim 1, wherein the target band entangled photon pair emitter and the guard band entangled photon pair emitter are disposed on a moving platform.

8. The detection system according to claim 7, wherein the moving platform comprises an aircraft, a spacecraft, a watercraft, or a land vehicle.

9. The detection system according to claim 1, wherein the target band entangled photon pair emitter and the guard band entangled photon pair emitter are configured to emit the target band entangled photon pair and the guard band entangled photon pair simultaneously.

10. The detection system according to claim 1, wherein the target band entangled photon pair emitter is configured to emit the target band sensing photon and the target band local photon at a target wavelength in the absorption band for the predetermined material.

11. The detection system according to claim 10, further comprising a target wavelength identification element configured to identify the target wavelength for the absorption band of the predetermined material when the target wavelength is unknown.

12. The detection system according to claim 11, wherein the target wavelength identification element comprises a pair of tunable lasers configured to identify appropriate frequencies for the predetermined material.

13. The detection system according to claim 1, wherein the predetermined material is a gas, a solid, a liquid, or a plasma.

14. The detection system according to claim 1, further comprising:
   a second target band entangled photon pair emitter configured to emit a second target band sensing photon and a second target band local photon, the second target band sensing photon being directed to the object; and
   a second target band detector configured to receive the second target band local photon and output a signal when the second target band local photon indicates that the second target band sensing photon has encountered the predetermined material in the object.

15. The detection system according to claim 1, further comprising:
   a target band processing unit configured to received and process the signals outputted by the target band detector and accumulate photon count statistics for each time interval.

16. The detection system according to claim 1, further comprising:
   a guard band processing unit configured to received and process the signals outputted by the guard band detector and accumulate photon count statistics for each time interval.

* * * * *